(12) United States Patent
Prater

(10) Patent No.: US 12,030,724 B2
(45) Date of Patent: Jul. 9, 2024

(54) HIGH TEMPERATURE RESISTANT CONVEYOR BELT

(71) Applicant: ContiTech Transportbandsysteme GmbH, Hannover (DE)

(72) Inventor: Grant Prater, Bexley, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 218 days.

(21) Appl. No.: 17/809,274

(22) Filed: Jun. 28, 2022

(65) Prior Publication Data
US 2023/0416003 A1 Dec. 28, 2023

(51) Int. Cl.
B65G 15/34 (2006.01)
C08L 23/16 (2006.01)

(52) U.S. Cl.
CPC .............. B65G 15/34 (2013.01); C08L 23/16 (2013.01); C08L 2205/025 (2013.01)

(58) Field of Classification Search
CPC .... B65G 15/34; B65G 2207/22; B65G 15/38; B65G 15/36; C08L 23/16; C08L 2205/025; B29D 29/06
See application file for complete search history.

(56) References Cited

U.S. PATENT DOCUMENTS

| | | | |
|---|---|---|---|
| 4,705,161 A | 11/1987 | Gozdiff | |
| 6,569,936 B1 | 5/2003 | Kawasaki et al. | |
| 8,007,917 B2 * | 8/2011 | Alexander | C08L 9/00 524/437 |
| 9,403,643 B2 * | 8/2016 | Sasakuma | C08K 3/012 |
| 9,580,249 B2 * | 2/2017 | Si | B65G 15/34 |
| 9,815,628 B2 | 11/2017 | Lotz et al. | |
| 9,962,906 B1 | 5/2018 | Maguire et al. | |
| 10,040,634 B2 | 8/2018 | Zou | |
| 10,266,345 B2 | 4/2019 | Rong et al. | |

(Continued)

FOREIGN PATENT DOCUMENTS

| | | |
|---|---|---|
| CN | 101559875 A | 10/2009 |
| CN | 102897472 A | 1/2013 |

(Continued)

OTHER PUBLICATIONS

International Search Report dated Jul. 20, 2023 of International Application PCT/EP2023/059893 which claims priority this application.

Primary Examiner — Mark A Deuble

(57) ABSTRACT

Heavy duty conveyor belts having excellent resistance to high temperatures. These conveyor belts can be repeatedly exposed to temperatures of greater than 150° C. or even greater than 200° C. without compromising the strength or reliability of the belt while providing a greatly extended service life. The conveyor belts generally include a reinforcement layer, a carry cover layer disposed above the reinforcement layer, a pulley cover layer disposed beneath the reinforcement layer. The carry cover layer contains a high temperature resistant compound based upon a peroxide curable rubber mixture of ethylene propylene copolymer with ethylene based polyolefin elastomer, and in some aspects, further includes a combination of diphenylamine (DPA), zinc 2-mercaptomethyl benzimidazole (ZMTI), and 2,2,4-trimethyl-1,2-dihydroquinoline (TMQ), and additionally, any other suitable additives.

20 Claims, 3 Drawing Sheets

(56) References Cited

U.S. PATENT DOCUMENTS

| | | | |
|---|---|---|---|
| 10,364,100 B2 | 7/2019 | Maguire et al. | |
| 10,442,625 B1 | 10/2019 | Henning et al. | |
| 10,734,353 B2 | 8/2020 | Fathi et al. | |
| 10,766,703 B2 | 9/2020 | Yang et al. | |
| 10,968,041 B1* | 4/2021 | Rong | B65G 15/34 |
| 11,634,564 B2* | 4/2023 | Rong | B65G 15/36 |
| | | | 198/846 |
| 2012/0031742 A1* | 2/2012 | Nakano | C08L 9/06 |
| | | | 524/184 |
| 2016/0272793 A1 | 9/2016 | Bedard et al. | |
| 2017/0152108 A1 | 6/2017 | Lotz et al. | |
| 2018/0346250 A1 | 12/2018 | Maguire et al. | |
| 2019/0359805 A1* | 11/2019 | Xu | B29B 7/286 |
| 2019/0359810 A1* | 11/2019 | Xu | C08K 5/0025 |
| 2020/0002515 A1 | 1/2020 | Stripe | |

FOREIGN PATENT DOCUMENTS

| | | |
|---|---|---|
| EP | 3386890 A1 | 10/2018 |
| JP | 4792708 B2 | 10/2011 |

* cited by examiner

HIGH TEMPERATURE RESISTANT CONVEYOR BELT

FIELD

The field to which the disclosure generally relates is conveyor belts having enhanced resistance to high temperatures. More specifically this disclosure relates to conveyor belts for the transportation of hot materials, such as hot cement and hot metals, at temperatures in excess of 250 deg C (° C.).

BACKGROUND

This section provides background information to facilitate a better understanding of the various aspects of the disclosure. It should be understood that the statements in this section of this document are to be read in this light, and not as admissions of prior art.

Conveyor belts are commonly utilized in a wide variety of commercial applications for the purpose of transporting products and materials. Such conveyor belts can serve in applications which have minimal demands, moderate demands, or in applications which are extremely demanding and which require heavy-duty conveyor belts for carrying heavy loads under adverse conditions, such as exposure to high temperatures. Conveyor belts can also very greatly in size and length. For instance, the conveyor belts used in mining applications can be very wide, for example over three meters wide, and very long, in some cases, on the order of many kilometers. They can also be up to about 7 centimeters thick or even thicker. In any case, heavy-duty conveyor belts are widely used for moving minerals, coal, cement, hot metal products, and a wide variety of manufactured products from one point to another. For instance, heavy-duty conveyor belts are often used in typical mining applications to transport minerals below the ground, to above the surface, and ultimately above ground to a desired location for processing and/or ultimately for transportation on railroad cars, trucks, barges, or ships. Heavy duty conveyor belts are also commonly used for moving hot cement from one location to another in cement plants and for transporting hot iron ore and metal alloys from blast furnaces. These are extremely demanding applications due to the heavy loads and extremely hot temperatures that are typically encountered.

Conventional conveyor belts which are used heavy duty applications where high temperatures can be encountered are typically comprised of a cured rubber as a top layer (the carry cover layer), a cured rubber as a bottom layer (the pulley cover layer), and a reinforcement layer which is situated between the top layer and the bottom layer. The prominent material used in such conveyor belts generally is a moderately flexible elastomeric or rubber-like material, such as an ethylene-propylene-diene monomer rubber (EPDM), and the belt is typically reinforced by a plurality of longitudinally extending steel cables, cords or fabrics, which are positioned within the belt and extend along the length thereof.

All conveyor belts are, of course, susceptible to normal wear and tear as well as damage from the material being transported and/or harsh environmental conditions. Over the years, substantial improvements have been made in the wear resistance of the rubber used as the cover carry layer of the conveyor belts and the useful service life of conveyor belts has been extended. However, conveyor belts which are routinely exposed to high temperatures generally have a shortened service life. Accordingly, there is a long felt need for heavy duty conveyor belts which may be repeatedly, or even continuously, exposed to high temperatures while providing a longer service life without compromising the strength or reliability of the belt. Accomplishing these objectives has proven to be elusive and there continues to be a need for such a high temperature resistant conveyor belt which can withstand temperatures of greater than 150° C., greater than 200° C., or even greater than 250° C. The need for such a high temperature resistant conveyor belt which can be manufactured in a commercially viable and cost-effective manner remains today.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, a conveyor belt includes a reinforcement layer, a carry cover layer above the reinforcement layer, and a pulley cover layer beneath the reinforcement layer. The carry cover layer may be a peroxide curable rubber mixture of ethylene propylene copolymer and ethylene based polyolefin elastomer, and the peroxide curable rubber mixture may further include diphenylamine (DPA), zinc 2-mercaptomethyl benzimidazole (ZMTI), and/or 2,2,4-trimethyl-1,2-dihydroquinoline (TMQ). The peroxide curable rubber mixture may have, after curing, a heat aged elongation % of more than 20%, more than 50%, more than 60%, or even more than 64.0%, after 240 hours of heat exposure at 177° C., and wherein the elongation testing is performed according to ASTM D412.

In some cases, the ethylene based polyolefin elastomer is a straight chain ethylene based polyolefin elastomer. The straight chain ethylene based polyolefin elastomer may be devoid of branching by copolymerization with propylene, in some aspects. In some other aspects, the ethylene based polyolefin elastomer has branching by copolymerization with propylene.

According to another aspects of the disclosure, a conveyor belt includes a reinforcement layer, a carry cover layer above the reinforcement layer, and a pulley cover layer beneath the reinforcement layer. The carry cover layer may be a peroxide curable rubber mixture of ethylene propylene copolymer and ethylene based polyolefin elastomer. The peroxide curable rubber mixture further contain a heat aged elongation extension package. The peroxide curable rubber mixture may have, after curing, a heat aged elongation % of more than 20%, more than 50%, more than 60%, or even more than 64.0%, after 240 hours of heat exposure at 177° C., and wherein the elongation testing is performed according to ASTM D412.

In some cases, the ethylene based polyolefin elastomer is a straight chain ethylene based polyolefin elastomer. The straight chain ethylene based polyolefin elastomer may be devoid of branching by copolymerization with propylene, in some aspects. In some other aspects, the ethylene based polyolefin elastomer has branching by copolymerization with propylene.

According to some aspects, the heat aged elongation extension package includes at least two of diphenylamine (DPA), zinc 2-mercaptomethyl benzimidazole (ZMTI), and 2,2,4-trimethyl-1,2-dihydroquinoline (TMQ). In some aspects, the heat aged elongation extension package contains diphenylamine (DPA), zinc 2-mercaptomethyl benzimidazole (ZMTI), and 2,2,4-trimethyl-1,2-dihydroquinoline (TMQ).

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
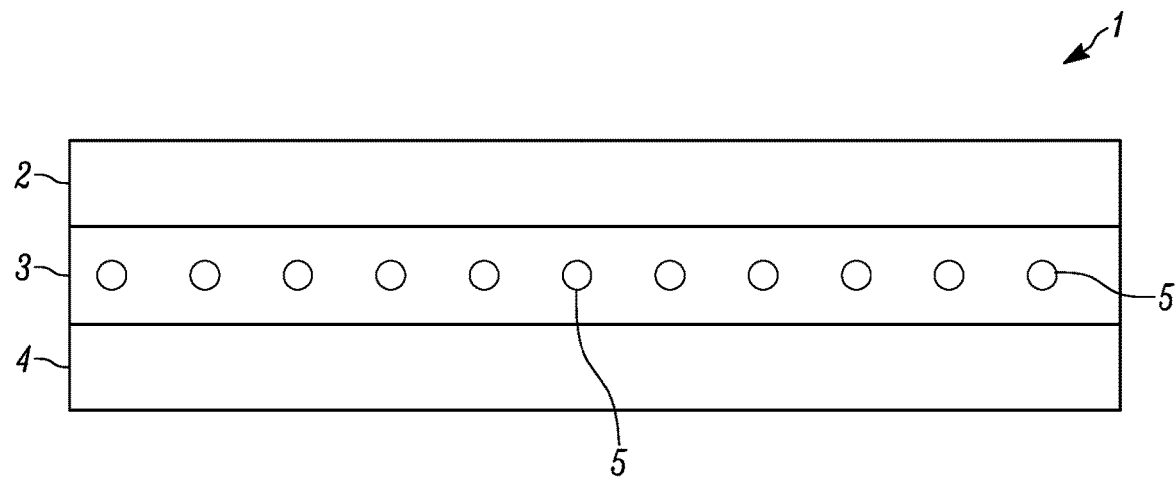
FIG. 1 is a schematic cross-sectional view of a conveyor belt which incorporates a high temperature resistant compound into the carry cover layer of the conveyor belt, according to the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some aspects of the disclosure are heavy duty conveyor belts having excellent resistance to high temperatures. These conveyor belts can be repeatedly exposed to temperatures of greater than 150° C., greater than 200° C., or even greater than 250° C. without compromising the strength or reliability of the belt while providing a greatly extended service life. The conveyor belts can also be manufactured in a commercially viable and cost-effective manner which makes them an attractive improvement over the conventional conveyor belts being used in high temperature applications today.

In some embodiments, conveyor belts include a reinforcement layer, an upper carry cover layer above the reinforcement layer, and a pulley cover layer beneath the reinforcement layer. The carry cover layer contains a high temperature resistant compound based upon a peroxide curable rubber mixture of ethylene propylene copolymer with ethylene based polyolefin elastomer, and may further include any combination of diphenylamine (DPA), zinc 2-mercaptomethyl benzimidazole (ZMTI), and/or 2,2,4-trimethyl-1,2-dihydroquinoline (TMQ), and additionally, any other suitable additives. According to some aspects of the disclosure, by utilizing a combination DPA, ZMTI, and TMQ, in a compound based upon a peroxide curable rubber mixture of ethylene propylene copolymer with ethylene based polyolefin elastomer, as a compound for a conveyor belt cover, the resulting elongation at break after aging 10 days (240 hours) in an oven at 350° F. (ca. 177° C.), was unexpectedly improved, significantly, compared to using a combination of DPA or TMQ alone. It is observed that compounds with higher retained elongation after oven aging would in turn increase the lifetime of a conveyor belt utilized at elevated temperatures.

In these conveyor belts, the carry cover layer optimally includes an outer surface layer which contains the high temperature resistant compound described hereinabove, and an inner layer containing an EPM elastomer and/or an EPDM elastomer. The outer surface layer may have any suitable thickness, and in some cases typically from about 1 mm to about 20 mm in thickness, or even from about 20 mm to about 40 mm in thickness.

Now referencing FIG. 1 illustrating a conveyor belt 1 which includes a carry cover layer 2 which contains the high temperature resistant compound in accordance with some aspects of the disclosure. This conveyor belt 1 includes an upper carry cover layer 2, a reinforcement layer 3, and pulley cover layer 4. The upper carry cover layer 2 is positioned above the reinforcement layer 3 (which can be constructed of a single ply or multiple plies) with the pulley cover layer 4 being positioned below the reinforcement layer 3. In this fundamental design the reinforcement layer 3 is accordingly situated between the carry cover layer 2 and the pulley cover layer 4.

Figure 2:
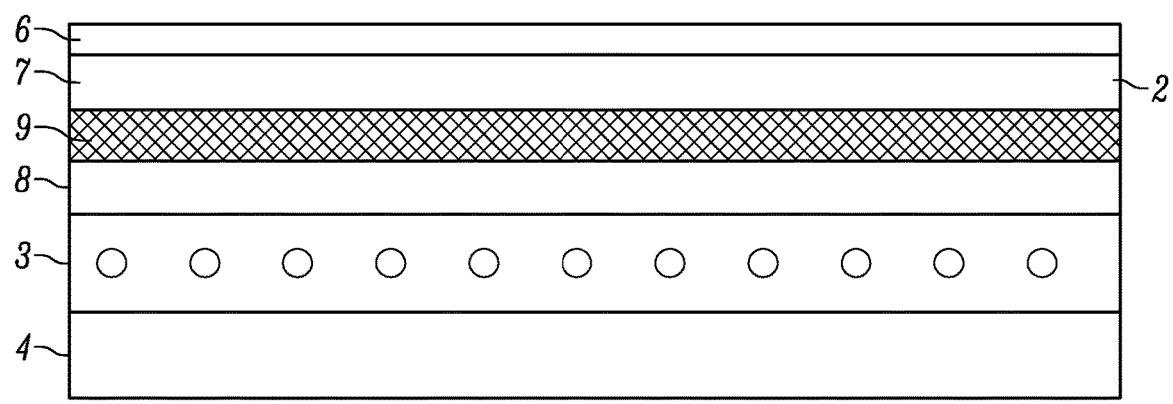
FIG. 2 is a schematic cross-sectional view of a conveyor belt of the disclosure which further includes a basalt layer and a thermal insulation (heat control) layer, according to the disclosure.
Figure 3:
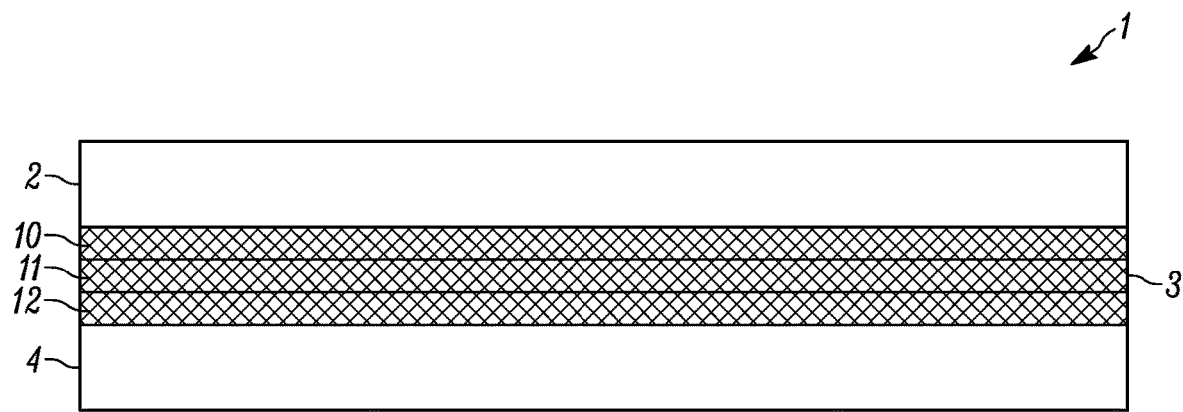
FIG. 3 is a schematic cross-sectional view of a conveyor belt of the disclosure which incorporates a high temperature resistant compound into the carry cover layer of the conveyor belt and which has a three ply layer of fabric reinforcement, according to the disclosure.
Figure 4:
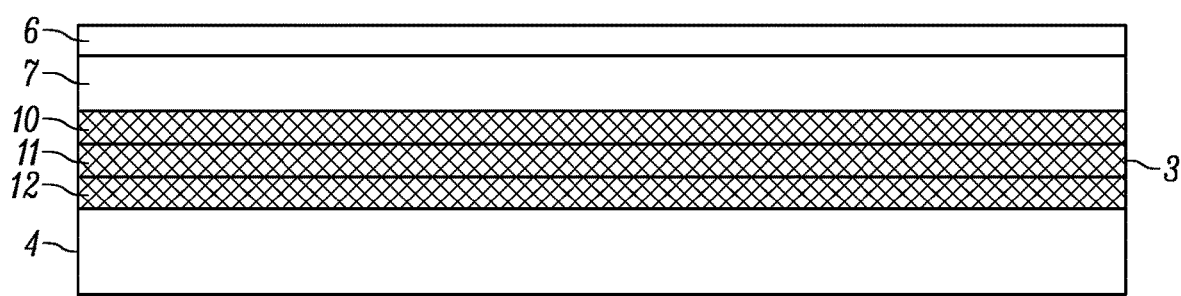
FIG. 4 is a schematic cross-sectional view of a conveyor belt of the disclosure wherein the carry cover layer includes an outer surface layer which is comprised of a high temperature resistant compound and an inner layer which is comprised of an EPM elastomer or an EPDM elastomer and which has a three ply layer of fabric reinforcement, according to the disclosure; and, FIG. 5 is a schematic cross-sectional view of a conveyor belt of the disclosure which further includes a basalt layer and a thermal insulation (heat control) layer and which has a three ply layer of fabric reinforcement.
Figure 5:
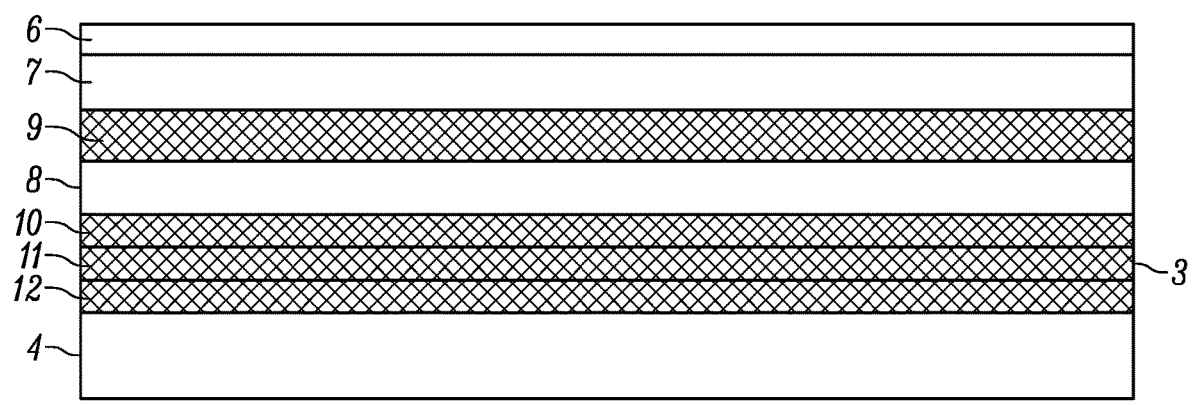

The reinforcement layer 3 and pulley cover layer 4 may be manufactured using materials and methods well known in the art. The reinforcement layer 3 may utilize a plurality of steel cables 5 to reinforce the conveyor belt and to provide it with strength and durability, as depicted in FIG. 1 and FIG. 2. The reinforcement layer may as an alternative to or in conjunction with the steel cables utilize fabric or polymer reinforcement components. For instance, the reinforcement layer is more typically constructed of one or more plies of a polymeric fiber as depicted in FIG. 3 through FIG. 5. More specifically, in FIG. 3 through FIG. 5, the reinforcement layer 3 is illustrated as having three plies of fabric reinforcement 10, 11, and 12. The fabric can optionally be formed of materials such as aramid, polyester, or nylon, or any suitable mixture thereof. In such a scenario polyester or nylon may typically be used for economic reasons. For example, polyethylene terephthalate (PET) or polyethylene naphthalate (PEN) can also advantageously be used with polyethylene terephthalate. The nylon fabrics that can be used in some reinforcement layers of conveyor belts of the disclosure may be comprised of virtually any type of nylon, such as nylon-6,6, nylon-6,12, nylon-6,10, nylon-6,9, nylon-6, nylon-11, or nylon-12. For commercial reasons, the nylon may typically be nylon-6,6 or nylon-6.

In one aspect of the disclosure, the reinforcement layer is constructed using three of four plies of a fabric which can be comprised of both nylon and polyester cords or yarns. The reinforcement components within the reinforcement layer may typically be embedded in a peroxide cured rubbery polymer, such as, but not limited to, ethylene-propylene-diene monomer elastomer (EPDM), ethylene-propylene elastomer (EPM), or combination thereof.

The pulley cover layer 4 can also be manufactured using materials and methods well known in the art and may include additional strengthening members within the layer. The pulley cover layer 4 will normally be comprised of a rubbery polymer, such as natural rubber, synthetic polyisoprene rubber, styrene-butadiene rubber, polybutadiene rubber, ethylene-propylene-diene monomer rubber, ethylene-propylene rubber, or a blend of two or more of these rubbery polymers. In some cases, the pulley cover layer is comprised of ethylene-propylene-diene monomer rubber, ethylene-propylene rubber, or a blend thereof. The pulley cover layer of the conveyor belts according to the disclosure may be of any suitable thickness, and in some cases, from about 1.6 mm to about 6 mm, or even from about 6 mm to about 10 mm in thickness.

The ethylene based polyolefin elastomers useful according to the disclosure are semi-crystalline polymers and copolymers derived mostly, if not entirely, from ethylene. These elastomers are produced in radical polymerization reactions at a high pressure and in catalytic polymerization reactions. Some ethylene based polyolefin elastomers useful according to the disclosure are so-called straight chain ethylene based polyolefin elastomers devoid of branching by copolymerization with propylene. However, use of ethylene based polyolefin elastomers having branching by copolymerization with propylene is also within the scope of the disclosure. The ethylene based polyolefin elastomer may be incorporated into the peroxide curable rubber mixture in an amount of from 20 to 50 parts per hundred (phr) rubber weight, 25 to 45 parts per hundred (phr) rubber weight, or even 30 to 50 parts per hundred (phr) rubber weight. According to the disclosure, the phrase "parts per hundred (phr) rubber weight" and the term "phr" are defined as the amount of a material expressed in parts per hundred resin/rubber and provides the weight of the material per 100 units of the base rubber(s).

The ethylene propylene copolymer elastomers useful according to the disclosure is also commonly referred to as ethylene propylene copolymer, ethylene propylene rubber (EPR), and sometimes called EPM referring to an ASTM standard, and is a type of synthetic elastomer. In the preparation of ethylene propylene copolymers, ethylene and propylene monomers are randomly combined and reacted to yield a rubbery, stable polymer. The ethylene propylene copolymer is incorporated into the peroxide curable rubber mixture in an amount of from 45 to 85 parts per hundred (phr) rubber weight, 55 to 75 parts per hundred (phr) rubber weight, or even 60 to 70 parts per hundred (phr) rubber weight.

The peroxide curing agents which may be used in the practice of the disclosure are those which are generally suitable for curing ethylene based polyolefin elastomer and ethylene propylene copolymer elastomer (EPM elastomer). Some representative examples of organic peroxides which can be used include, but not limited to, dicumyl peroxide, bis-(t-butyl peroxy-diisopropyl benzene, t-butyl perbenzoate, di-t-butyl peroxide, 2,5-dimethyl-2,5-di-t-butylperoxyhexane, alpha-alpha-bis(t-butylperoxy) diisopropylbenzene, methylethyl ketone peroxide, cyclohexanone peroxide, cumene hydroperoxide, pinane hydroperoxide, p-menthane hydroperoxide, t-butyl hydroperoxide, di-t-butyl peroxide, and the like. Dicumyl peroxide, 2,5-dimethyl-2,5-di-t-butylperoxyhexane and/or di-t-butyl peroxide may be the peroxide compounds used in some embodiments. In any case, the peroxide crosslinking agent will typically be supported on an inert powdered carrier, such as silica, clay or calcium carbonate. The peroxide will typically be present on the powdered carrier at a level which is within the range of about 40 weight percent to about 70 weight percent, or even at a level in the range of about 50 weight percent to 60 weight percent, based upon the total weight of the peroxide and the carrier.

In another aspect of the disclosure, as illustrated in FIG. 2, the conveyor belt can also include a basalt fiber layer or a fiberglass layer, and a thermal insulation layer to provide an even higher level of resistance to high temperatures. In this aspect, the carry cover layer 2 includes an outer surface layer 6 which is comprised of the fluoroelastomer and an inner layer 7 which is comprised of an EPM elastomer and/or an EPDM elastomer. A basalt fiber layer or a fiberglass layer 9 is situated beneath the cover carry layer 2 and above a thermal insulation layer 8. The basalt fiber is an extremely fine fiber which is comprised of plagioclase, pyroxene, and olivine.

The thermal insulation layer 8 may be comprised of a rubbery polymer composition which has a low level of thermal conductivity with the reinforcement layer 3 being situated beneath the thermal insulation layer 8 and above the pulley cover layer 4. In one aspect of the disclosure, the thermal insulation layer 8 is comprised of an ethylene-propylene-alkylidene norbornene terpolymer rubber which contains a chlorinated, cyclic aliphatic hydrocarbon resin. For instance, the thermal insulation layer 8 can be a blend of Nordel® 4520 EPDM elastomer or Nordel® 4640 EPDM elastomer with Dechlorane® Plus 515 chlorinated, cyclic aliphatic hydrocarbon resin. In another aspect of the disclosure, the thermal insulation layer can be comprised of an EPDM elastomer containing glass, aramid, or carbon fibers and optionally an inorganic or organic flame retardant, such as a chlorinated hydrocarbon. The glass, aramid, polyamide, or carbon fibers used in such thermal insulation layers are typically chopped fibers which are from 0.1 mm to 0.5 mm long and preferably from 0.2 mm to 0.4 mm in length. The rubber in the thermal insulation layer can also optionally be comprised of ammonium sulfate, antimony oxide and/or hydrated alumina. In still another aspect of the disclosure, the thermal insulation layer 8 can be comprised of a maleic anhydride modified EPDM elastomer which contains glass, aramid, polyamide, or carbon fibers. The thermal insulation material used in the thermal insulation layer can also optionally be blown to further reduce thermal conductivity.

Examples

The following experimental data was generated for the purpose of further illustrating the nature of some of the embodiments and aspects of the disclosure, and are not intended as a limitation on the scope thereof.

In the following examples, in preparing elastomeric compositions used for forming a carry cover layer elastomer, in a first pass, a non-productive blend of components was mixed in an internal mixer as indicated in the tables. The non-productive blend was dropped at a temperature of from about 138° C. to about 165° C. Thereafter, in a second pass, additional 'productive blend components' (i.e. zinc salt based activator, 2,5-dimethyl-2,5-di-t-butylperoxyhexane and 72% by weight trimethylolpropane trimethacrylate) were added to non-productive blend to form a final productive blend by mixing in an internal mixer. The productive blend was dropped at a temperature of from about 99° C. to about 110° C. Ingredients used for these examples, Ex. 1 through Ex. 8, are provided in Table 1.

The productive blends were then formed into 2 mm thick sheets, and cured at temperature of about 165° C. for 30 minutes. Cured sample retained elongation % after 240 hours at 177° C. is provided at the bottom of Table 1, and the elongation testing was performed according to ASTM D412. The values for elongation % (before breaking) after high temperature aging showed a surprising and unexpected significant result in elongation % when a combination of diphenylamine (DPA), zinc 2-mercaptomethyl benzimidazole (ZMTI), and 2,2,4-trimethyl-1,2-dihydroquinoline (TMQ), in comparison to using only DPA, only ZMTI, only DPA and ZMTI together, only TMQ and ZMTI together, only DPA and TMQ together, or using none of DPA, TMQ or ZMTI. Surprisingly, the testing results show over a two-fold increase in heat aged elongation when using a combination of ZMTI, DPA and TMQ, in comparison to using only two of any of these materials together. As such, using a combination of ZMTI, DPA and TMQ provides heat aged elongation % of more than 50%, more than 60%, or even more than 64.0%. Such combination of DPA, TMQ and ZMTI can be considered a heat aged elongation extension package. Also, a combination of any two of DPA, TMQ and ZMTI, or even ZMTI alone can be considered a heat aged elongation extension package.

TABLE 1

| Ingredient | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Ethylene propylene copolymer | 65 | 65 | 65 | 65 | 65 | 65 | 65 | 65 |
| Ethylene based polyolefin elastomer | 35 | 35 | 35 | 35 | 35 | 35 | 35 | 35 |
| N-330 carbon black | 38 | 38 | 38 | 38 | 38 | 38 | 38 | 38 |
| Silica | 8.75 | 8.75 | 8.75 | 8.75 | 8.75 | 8.75 | 8.75 | 8.75 |
| DPA | 1.67 |  | 1.67 |  | 1.67 | 1.67 | 1.67 |  |
| ZMTI | 3.33 |  |  | 3.33 | 3.33 | 3.33 |  | 3.33 |
| TMQ |  |  |  |  | 1 | 2 | 3.33 | 1.67 |
| Zinc stearate | 1.5 | 1.5 | 1.5 | 1.5 | 1.5 | 1.5 | 1.5 | 1.5 |
| C-5 aliphatic resin | 5 | 5 | 5 | 5 | 5 | 5 | 5 | 5 |
| Fatty acid processing aid | 3 | 3 | 3 | 3 | 3 | 3 | 3 | 3 |
| Zinc oxide | 10 | 10 | 10 | 10 | 10 | 10 | 10 | 10 |
| Zinc salt based activator | 3 | 3 | 3 | 3 | 3 | 3 | 3 | 3 |
| 2,5-dimethyl-2,5-di-t-butylperoxyhexane | 6.75 | 6.75 | 6.75 | 6.75 | 6.75 | 6.75 | 6.75 | 6.75 |
| 72% trimethylolpropane trimethacrylate | 2.75 | 2.75 | 2.75 | 2.75 | 2.75 | 2.75 | 2.75 | 2.75 |
| Total PHR | 183.75 | 178.75 | 180.42 | 182.08 | 184.75 | 185.75 | 183.75 | 183.75 |
| Cured sample retained elongation % after 240 hours at 177° C. | 25.3 | 1.3 | 1.0 | 21.2 | 64.2 | 64.9 | 25.6 | 27.4 |

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE SIGNS (PART OF THE DESCRIPTION)

1 Conveyor belt
2 Carry cover layer
3 Reinforcement layer
4 Pulley cover layer
5 Steel cable
6 Outer surface layer
7 Inner layer
8 Thermal insulation layer
9 Fiberglass layer
10 Fabric reinforcement
11 Fabric reinforcement
12 Fabric reinforcement

What is claimed is:

1. A conveyor belt comprising a reinforcement layer, a carry cover layer above the reinforcement layer, and a pulley cover layer beneath the reinforcement layer, wherein the carry cover layer comprises a peroxide curable rubber mixture of ethylene propylene copolymer and ethylene based polyolefin elastomer, and wherein the peroxide curable rubber mixture further comprises diphenylamine (DPA), zinc 2-mercaptomethyl benzimidazole (ZMTI), and 2,2,4-trimethyl-1,2-dihydroquinoline (TMQ).

2. The conveyor belt according to claim 1, wherein the peroxide curable rubber mixture has, after curing, a heat aged elongation % of more than 50% after 240 hours of heat exposure at 177° C., and wherein the elongation testing is performed according to ASTM D412.

3. The conveyor belt according to claim 2, wherein the heat aged elongation % is more than 60%.

4. The conveyor belt according to claim 3, wherein the heat aged elongation % is more than 64.0%.

5. The conveyor belt according to claim 1, wherein the ethylene based polyolefin elastomer is a straight chain ethylene based polyolefin elastomer.

6. The conveyor belt according to claim 5, wherein the straight chain ethylene based polyolefin elastomer is devoid of branching by copolymerization with propylene.

7. The conveyor belt according to claim 1, wherein the ethylene based polyolefin elastomer has branching by copolymerization with propylene.

8. The conveyor belt according to claim 1, wherein the ethylene based polyolefin elastomer is incorporated into the peroxide curable rubber mixture in an amount of from 20 to 50 parts per hundred (phr) rubber weight.

9. The conveyor belt according to claim 1, wherein the ethylene propylene copolymer is incorporated into the peroxide curable rubber mixture in an amount of from 45 to 85 parts per hundred (phr) rubber weight.

10. A conveyor belt comprising a reinforcement layer, a carry cover layer above the reinforcement layer, and a pulley cover layer beneath the reinforcement layer, wherein the carry cover layer comprises a peroxide curable rubber mixture of ethylene propylene copolymer and ethylene based polyolefin elastomer, and wherein the peroxide curable rubber mixture further comprises a heat aged elongation extension package.

11. The conveyor belt according to claim 10, wherein the peroxide curable rubber mixture has, after curing, a heat aged elongation % of more than 50% after 240 hours of heat exposure at 177° C., and wherein the elongation testing is performed according to ASTM D412.

12. The conveyor belt according to claim 11, wherein the heat aged elongation % is more than 60%.

13. The conveyor belt according to claim 12, wherein the heat aged elongation % is more than 64.0%.

14. The conveyor belt according to claim 10, wherein a heat aged elongation extension package consists of at least two members selected from the group consisting of diphenylamine (DPA), zinc 2-mercaptomethyl benzimidazole (ZMTI), and 2,2,4-trimethyl-1,2-dihydroquinoline (TMQ).

15. The conveyor belt according to claim 10, wherein a heat aged elongation extension package consists of diphenylamine (DPA), zinc 2-mercaptomethyl benzimidazole (ZMTI), and 2,2,4-trimethyl-1,2-dihydroquinoline (TMQ).

16. The conveyor belt according to claim 10, wherein the peroxide curable rubber mixture has, after curing, a heat aged elongation % of more than 20% after 240 hours of heat exposure at 177° C., and wherein the elongation testing is performed according to ASTM D412.

17. The conveyor belt according to claim 10, wherein the ethylene based polyolefin elastomer is a straight chain ethylene based polyolefin elastomer.

18. The conveyor belt according to claim 17, wherein the straight chain ethylene based polyolefin elastomer is devoid of branching by copolymerization with propylene.

19. The conveyor belt according to claim 10, wherein the ethylene based polyolefin elastomer is incorporated into the peroxide curable rubber mixture in an amount of from 20 to 50 parts per hundred (phr) rubber weight.

20. The conveyor belt according to claim 10, wherein the ethylene propylene copolymer is incorporated into the peroxide curable rubber mixture in an amount of from 45 to 85 parts per hundred (phr) rubber weight.

* * * * *